(12) United States Patent
Fonti et al.

(10) Patent No.: US 9,769,022 B2
(45) Date of Patent: Sep. 19, 2017

(54) TIMEOUT VALUE ADAPTATION

(71) Applicant: International Business Machines Corporation, Armonk, NY (US)

(72) Inventors: Leda Fonti, Rome (IT); Francesco Lupini, Rome (IT); Patrizia Manganelli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 14/060,803

(22) Filed: Oct. 23, 2013

(65) Prior Publication Data
US 2014/0136659 A1    May 15, 2014

(30) Foreign Application Priority Data

Nov. 13, 2012 (GB) .................................. 1220406.1

(51) Int. Cl.
*H04L 12/24* (2006.01)
*H04L 12/26* (2006.01)

(52) U.S. Cl.
CPC ...... *H04L 41/0846* (2013.01); *H04L 43/0864* (2013.01); *H04L 43/10* (2013.01); *H04L 43/0817* (2013.01); *H04L 43/16* (2013.01)

(58) Field of Classification Search
CPC .......................... H04L 29/08072; H04L 29/06; H04L 29/0809
USPC ........................................................ 709/219
See application file for complete search history.

(56) References Cited

U.S. PATENT DOCUMENTS

| 6,012,096 | A | 1/2000 | Link et al. |
| 6,446,225 | B1 | 9/2002 | Robsman et al. |
| 6,526,433 | B1 * | 2/2003 | Chang ................. G06F 11/0709 709/201 |

(Continued)

FOREIGN PATENT DOCUMENTS

CN     101208969 B     5/2012

OTHER PUBLICATIONS

Search Report under Section 17(5) dated Mar. 18, 2013, Application No. GB1220406.1, 3 pages.

(Continued)

*Primary Examiner* — Nicholas Taylor
*Assistant Examiner* — Chong G Kim
(74) *Attorney, Agent, or Firm* — Francis Lammes; Stephen J. Walder, Jr.; Jeffrey S. LaBaw

(57) ABSTRACT

A mechanism is provided for updating a timeout value of an application in a computer system. Hardware and software configuration data of the remote computing device is determined. A local computing device in the server system is provided in accordance with the determined hardware and software configuration data. An application on the local computing device is executed for determining the execution time of the application. An echo request packet is sent to the remote computing device. A current network time delay is determined from the elapsed time between sending and receiving a response to the echo request packet from the remote computing device. The timeout value from the current network time delay and the execution time is calculated. The sending, determining, and calculating steps are repeated during execution of the application by the remote computing device for repeatedly updating the timeout value using the calculated timeout value.

20 Claims, 2 Drawing Sheets

(56) References Cited

U.S. PATENT DOCUMENTS

| | | | |
|---|---|---|---|
| 6,560,648 B1 | 5/2003 | Dunn et al. | |
| 6,973,417 B1 | 12/2005 | Maxwell, III et al. | |
| 7,490,327 B1* | 2/2009 | Branda | G06F 9/4818 |
| | | | 707/999.002 |
| 7,813,910 B1 | 10/2010 | Poulin | |
| 8,214,492 B2 | 7/2012 | Chauvin et al. | |
| 8,307,031 B1* | 11/2012 | Grieve | H04L 69/40 |
| | | | 709/203 |
| 8,468,196 B1* | 6/2013 | Roskind | H04L 67/325 |
| | | | 709/203 |
| 8,655,326 B2* | 2/2014 | Ait-Ameur | H04L 67/322 |
| | | | 455/414.1 |
| 8,966,487 B1* | 2/2015 | Leonard | G06F 9/54 |
| | | | 718/101 |
| 8,990,410 B1* | 3/2015 | Damodaran | H04L 12/2602 |
| | | | 707/602 |
| 2005/0209804 A1* | 9/2005 | Basso | H04L 69/28 |
| | | | 702/79 |
| 2006/0031553 A1* | 2/2006 | Kim | H04L 29/06027 |
| | | | 709/231 |
| 2006/0080383 A1* | 4/2006 | Hasson | H04L 67/06 |
| | | | 709/203 |
| 2007/0192329 A1* | 8/2007 | Croft | G06F 3/1415 |
| 2008/0155688 A1* | 6/2008 | Casazza | G06F 12/1466 |
| | | | 726/21 |
| 2008/0159318 A1* | 7/2008 | Pierlot | G06F 21/335 |
| | | | 370/412 |
| 2008/0189350 A1* | 8/2008 | Vasa | H04L 12/2602 |
| | | | 709/201 |
| 2010/0329127 A1* | 12/2010 | Pirozzi | H04L 43/0805 |
| | | | 370/242 |
| 2011/0040826 A1* | 2/2011 | Chadzelek | H04L 67/02 |
| | | | 709/203 |
| 2011/0055376 A1* | 3/2011 | Little | G06F 9/466 |
| | | | 709/224 |
| 2011/0106940 A1* | 5/2011 | Chauvin | G06F 11/0757 |
| | | | 709/224 |
| 2011/0252425 A1* | 10/2011 | Piccazzo | G06F 9/4843 |
| | | | 718/100 |
| 2012/0137217 A1* | 5/2012 | Amsterdam | G06F 1/3228 |
| | | | 715/256 |
| 2012/0159232 A1* | 6/2012 | Shimada | G06F 11/1662 |
| | | | 714/3 |
| 2012/0185585 A1* | 7/2012 | Bhate | H04L 63/1458 |
| | | | 709/224 |
| 2012/0190307 A1 | 7/2012 | Huang | |
| 2012/0311138 A1* | 12/2012 | Inamdar | G06F 11/3404 |
| | | | 709/224 |
| 2013/0086144 A1* | 4/2013 | Wu | H04L 67/145 |
| | | | 709/203 |
| 2013/0145025 A1* | 6/2013 | Ishikawa | G05B 19/05 |
| | | | 709/224 |
| 2013/0311622 A1* | 11/2013 | Das Gupta | G06F 9/466 |
| | | | 709/221 |

OTHER PUBLICATIONS

Cai, Jing et al., "An Adaptive Timeout Strategy for UDP Flows Using SVMs", IEEE, The 11th International Conference on Parallel and Distributed Computing, Applications and Technologies, 2010, pp. 118-127.

Dixit, Monica et al., "Timeout-based Adaptive Consensus: Improving Performance through Adaptation", SAC'12, Riva del Garda (Trento), Italy, Mar. 22-29, 2012, 6 pages.

Xylomenos, George et al., "Adaptive Timeout Policies for Wireless Links", IEEE, Proceedings of the 20th International Conference on Advanced Information Networking and Applications (AINA'06), 2006, 6 pages.

* cited by examiner

TIMEOUT VALUE ADAPTATION

BACKGROUND

The invention relates to the field of data processing, and more particularly to a method for updating a timeout value of an application in a computer network system.

When a server launches a remote task on a target machine, the task cancellation or cessation automatically occurs when a predefined interval of time i.e. timeout has passed. Timeouts are needed in order to free up communications, ports and system resources that are tied up with task requests that have not been answered in a reasonable amount of time.

SUMMARY

In one illustrative embodiment, a method, in a data processing system, is provided for updating a timeout value of an application in a computer system. The illustrative embodiment determines hardware and software configuration data of a remote computing device. The illustrative embodiment provides a local computing device in the server system in accordance with the determined hardware and software configuration data. The illustrative embodiment executes an application on the local computing device for determining an execution time of the application. The illustrative embodiment an echo request packet to the remote computing device. The illustrative embodiment determines a current network time delay from an elapsed time between sending and receiving a response to the echo request packet from the remote computing device. The illustrative embodiment calculates the timeout value from the current network time delay and the execution time. The illustrative embodiment repeats the sending, determined, and calculating steps during execution of the application by the remote computing device for repeatedly updating the timeout value using the calculated timeout value.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

In the following, preferred embodiments of the invention will be described in greater detail by way of example only making reference to the drawings in which.

DETAILED DESCRIPTION

It is an objective of embodiments of the invention to provide for an improved computer-implemented method for updating a timeout value of an application in a computer network system, a computer system and a computer program product.

In the following, like numbered elements in the figures either designate similar elements or designate elements that perform an equivalent function. Elements which have been discussed previously will not necessarily be discussed in later figures if the function is equivalent.

Figure 1:
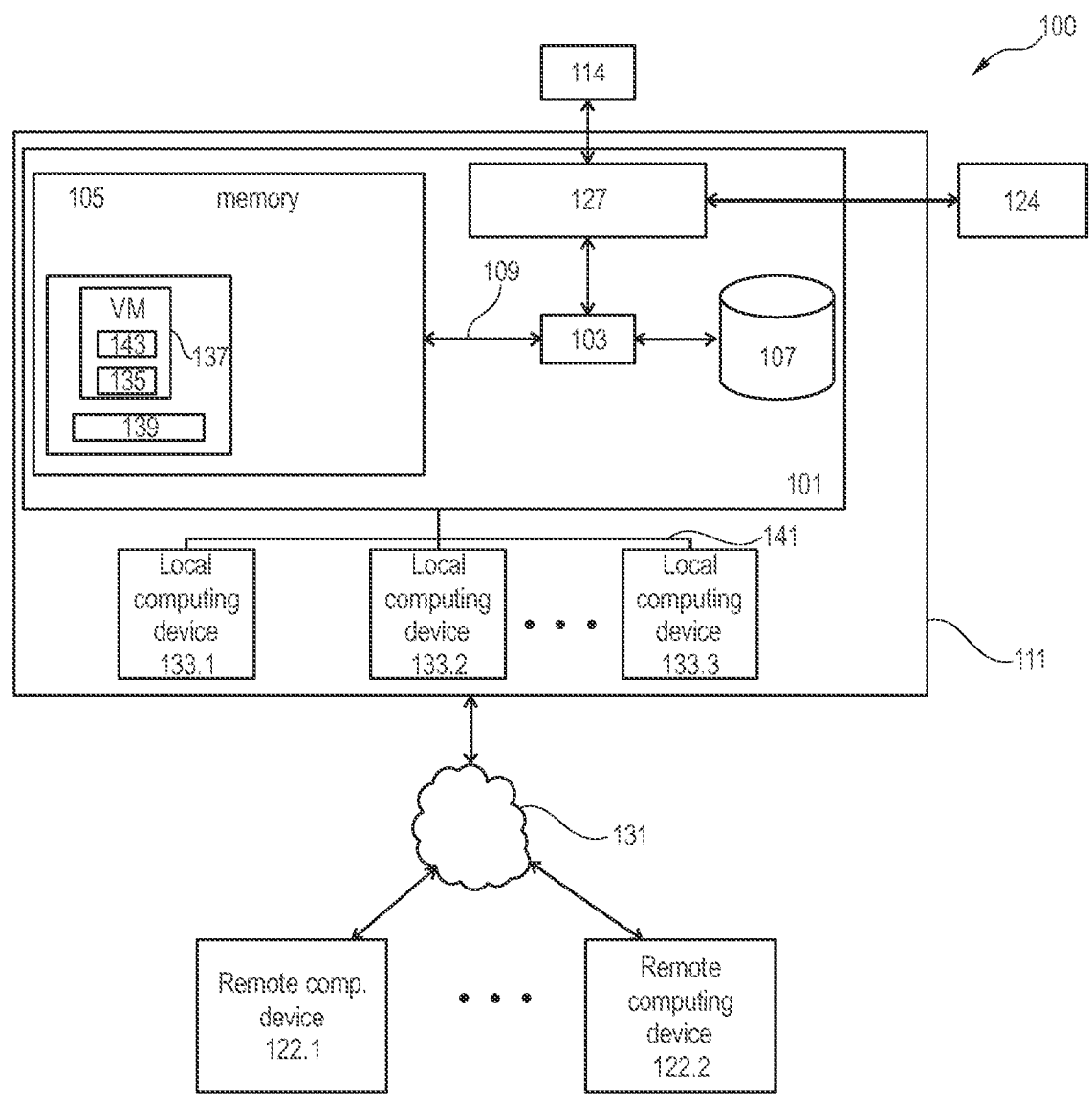
FIG. 1 illustrates system architecture for the execution of a method for updating a timeout value of an application.

FIG. 1 depicts a computer system 100 operable to execute a process for updating a timeout value of an application. The computer system 100 may be, for example, a computer network system and/or a distributed computing system such as cloud computing system, grid computing system and cluster computing systems.

The computer system 100 comprises a server system 111 and a set of remote computing devices 122.1, 122.2, . . . . The server system 111 may be connected to the remote computing devices 122.1, 122.2, . . . via a network 131, which may be a public network, such as the Internet, a private network, such as a wide area network (WAN), or a combination thereof.

The server system 111 comprises a computer server 101 and a plurality of local computing devices 133.1, 133.2, 133.3, . . . . The plurality of local computing devices 133.1, 133.2, 133.3, . . . and the computer server 101 are physically close to each other and connected to each other via wired LANs or physical media 141, such as e.g. coaxial cable, twisted pair or optical fiber cable. They may have the advantage of providing a fast connection between the computer server 101 and the local computing devices 133.1, 133.2, 133.3, . . . . A WLAN may also be used to connect the local computing devices 133.1, 133.2, 133.3, . . . and the computer server 101.

As shown in FIG. 1, computer server 101 in computing system 100 is shown in the form of a general-purpose computing device. The components of computer server 101 may include, but are not limited to, one or more processors or processing units 103, a computer memory 105, a computer storage 107 and a bus 109 that couples various system components including computer memory 105 to processor 103.

Computer server 101 may also communicate with one or more external devices 114 such as a keyboard, a pointing device, a display 124, etc.; one or more devices that enable a user and/or an administrator of the computing system 100 to interact with computer server 101; and/or any devices (e.g., network card, modem, etc.) that enable computer server 101 to communicate with one or more other computing devices. Such communication may occur via I/O interface(s) 127.

The user of the computing system 100 may send a request to the computer server 101 to run an application 135. The application 135 may be a processing task that is to be executed by a data processing system. In response, the computer server 101 may first select one remote computer device e.g. 122.1 of the set of remote computing devices 122.1, 122.2, . . . based on the application 135 and may execute the application 135 on the selected remote computing devices 122.1.

The computer system 100 may provide a timeout value which is associated with the application 135. For example, the user may send the request in form of one or more jobs to run the application 135. Multiple batch queues might be used by the computer system 100 to differentiate types of jobs depending on parameters such job priority and/or estimated execution time. For example, a batch queue may comprise jobs requiring the same execution time. The user may specify in the request the batch queue he or she wanted to use to run the application 135. From that, the computer server 101 may determine the timeout value associated with the application as the execution time associated with the selected batch queue. In another example, the computer system 100 may comprise a predefined set of timeout values that are determined depending on the user of the application and/or the application itself.

The computer server 101 may determine the hardware and software configuration data of the remote computing device 122.1 where the application 135 is executed. This may be done offline after receiving the request from the user to run the application 135 and before executing the application 135 on the remote computing device 122.1. In another example, this may be done online during the execution of the application 135 provided that the network time delay is at least twice higher than the execution time of the application 135 in the remote computing device 122.1. In case of a smaller network time delay, a parallel execution of the application 135 on the local computing device may only end after the execution of the application 135 on the remote computing device 122.1 is finished.

The hardware and software configuration data may be indicative, for example, of the remote computing device load which is a measure of the amount of computational work that the remote computing device 122.1 performs. The remote computing device load may be measured at the time the computer server 101 receives the user's request. In another example, the remote computing device load may be an average load representing the average remote computing device load over a period of time. The period of time may be chosen in accordance with the time at which the computer server 101 receives the user's request. For example, if the user sends the request during the weekend the period of time is chosen as a non-working time period.

The hardware and software configuration data may be further indicative of the resources to be allocated to the application 135. The resources are allocated before execution of the application 135 on the remote computing device 122.1. The resources may be for example the amount of memory and/or number of CPU.

The hardware and software configuration data may be further indicative of the configuration of the remote computing device 122.1 itself. For example, it may indicate the total number of CPU and the amount of memory, the type of the hardware and also the software being installed in the remote computing device 122.1. These data may be accessed, for example, by the computer server 101 in a meta-database (not shown) of the computing system 100. The meta-database contains information on the remote computing devices 122.1, 122.2, . . . , including said hardware and software configuration data that describe the remote computing device itself.

Using the hardware and software configuration data, the computer server 101, may provide a twin computing device of the remote computing device 122.1.

The twin computing device may be a local computing device 133.1, 133.2, 133.3, . . . in the server system 111. For example, the server system 111 comprises a table having one or more entries. Each entry represents a local computing device e.g. 133.1 of the plurality of local computing devices 133.1, 133.2, 133.3, . . . . Each entry comprises a local computing device identifier and hardware and software configuration data of the local computing device. The table may be stored in a memory of the computing system 100. This may accelerate the process of the local computing device selection. The computer server 101 may read the table, and select a local computing device identifier of the local computing device 133.1 associated with the hardware and software configuration determined for the remote computing device 122.1 to run the application 135. The local computing device 133.1 represented by the local computing device identifier is then used as the twin computing device. The twin computing device may have the same hardware and software configuration as the remote computing device 122.1 and may be also able to allocate the same amount of resources to the application 135 as the amount of resources allocated by the remote computing device server 122.1.

In addition, the twin computing device 133.1 may also mimic the remote computing device load. This load may already exist in the selected local computing device and/or may be simulated by the computer server 101 in the selected computer device if the selected local computing device 133.1 has smaller load than the load of the remote computing device 122.1.

In another example, the twin computing device may be a virtual machine 137. The computer server 101 comprises in its computer memory 105 a hypervisor 139. The hypervisor 139 may create the virtual machine 137 based on determined hardware and configuration data of the remote computing device 122.1. The hypervisor 139 may transform physical resources into virtual resources. For example, the hypervisor 139 may enable the virtual machine 137 to have dedicated or shared processors and I/O, and dedicated memory and other resources in accordance with the hardware and software configuration determined for the remote computing device 122.1 to run the application 135. The virtual machine 137 comprises an operating system 143 and the application 135 that may run on the operating system 143.

In a further example, the computer server 101 may provide multiple twin computing devices. For example, the computer server 101 may determine a set of hardware and software configuration data of the remote computing device 122.1 associated with respective operational conditions of the remote computing device 122.1. For example, a first hardware and software configuration data may describe the remote computing device 122.1 having a load of 20% of its capacity. A second hardware and software configuration data may describe the remote computing device 122.1 having a load of 80%. For each hardware and software configuration data of the set of hardware and configuration data the computer server 101 may provide, as described above, a local computing device in the server system 111 in accordance with the given hardware and software configuration data.

Furthermore, the computer server 101 may execute the application 135 on the twin computing device for determining the execution time of the application. In case of multiple twin computing devices, the computer server may execute the application 135 on each of the twin computing devices for determining the execution time of the application; and thereby providing a set of execution time values.

Next, the computer server 101 may ping an IP address associated with the remote computing device 122.1, for determining the current roundtrip time i.e. a current network time delay as the length of time it takes for a signal (of ping command) to be sent plus the length of time it takes for an acknowledgment of that signal to be received from the remote computing device 122.1.

The computer server 101 may calculate the timeout value from the current network time delay and the execution time. For example, the timeout value may be equal to the sum of the current network time delay and the determined execution time of the application 135.

During execution of the application 135 by the remote computing device 122.1, the computer server 101 may repeat the steps of pinging and timeout calculation for continuously updating the timeout value using the calculated timeout value.

In case the calculated timeout value is an error value such as a a negative time value, a zero, an infinity value, and/or a not-a-number (NaN), the computer server 101 may prompt the current network delay time and the execution time on the display 114 to the administrator to enter update data indicative for example of a suitable timeout value. The computer server 101 may receive the update data via the interface 127, and may thus update the timeout value based on the received updated data.

In another case, the computer server 101, before updating the timeout value, may suspend the execution of the application 135 in the remote computing device 122.1, so as to prompt on the display 114 a log file of the application's outputs to the user in addition to tabs displaying "Updating timeout value" and "Not updating timeout value" to be selected by the user. The computer server 101 may receive response data via the interface 127 from the user. Based on the received response data, the computer server 101 may update the timeout value using the calculated timeout value; and resume the execution of the application 135 in the remote computing device 122.1.

Figure 2:
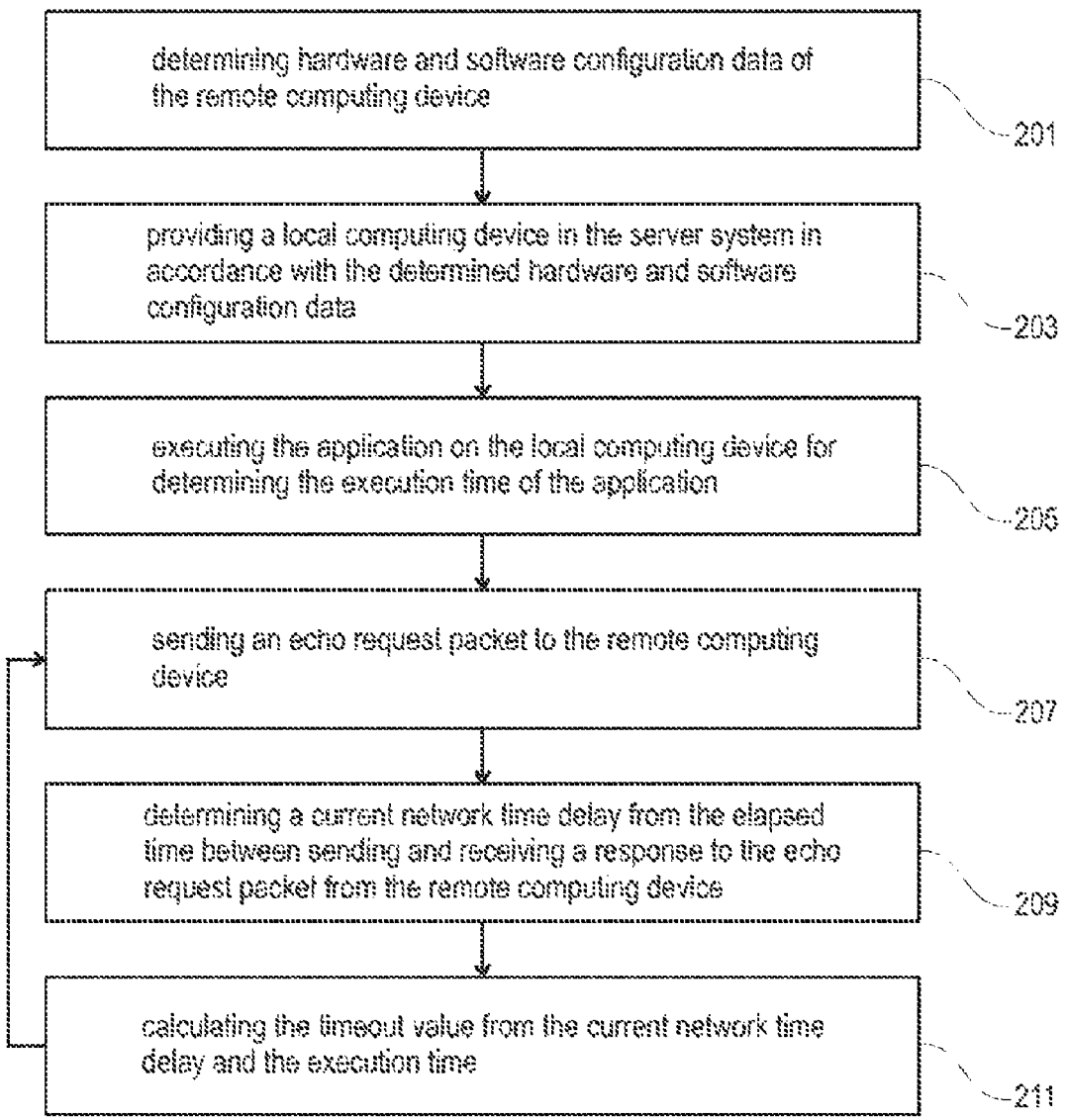
FIG. 2 is a flowchart of a method for updating a timeout value of an application in a network computing system.

FIG. 2 is a flowchart of a method for a computer implemented method for updating a timeout value of an application in a computer network system, the computer system comprising a server system and a remote computing device, wherein the server system and the remote computing device are separate from each other and connected with each other via a network, wherein the server system comprises a server that executes the application on the remote computing device.

In step 201, hardware and software configuration data of the remote computing device is determined.

In step 203, a local computing device in the server system is provided in accordance with the determined hardware and software configuration data.

In step 205, the application is executed on the local computing device for determining the execution time of the application.

In step 207, an echo request packet is sent to the remote computing device.

In step 209, a current network time delay is determined from the elapsed time between sending and receiving a response to the echo request packet from the remote computing device.

In step 211 the timeout value is calculated from the current network time delay and the execution time.

In this flowchart there is an arrow that looks back from step 211 to step 207. This indicates that the method proceeds again through steps 207, 209, and 211. This loop continues until execution of the application is finished, and during which the timeout value data may be repeatedly updated using the repeatedly calculated timeout value.

Thus, the illustrative embodiments provide for an improved computer-implemented method for updating a timeout value of an application in a computer network system, a computer system and a computer program product. In one aspect, the present invention relates to a computer implemented method for adapting a timeout value of an application in a computer network system. The computer system comprises a server system and a remote computing device. The server system and the remote computing device are separate from each other and connected with each other via a network. The server system comprises a server that executes the application on the remote computing device. The remote computing device and the server system are connected virtually and/or physically via the network. The term "timeout value" as used herein refers to the amount of time that is allocated for an event to occur or complete before operation is interrupted. The term "server" as used herein refers to an equipment comprising hardware, software and/or firmware means that is responsible for managing services and requests, and running policies.

The illustrative embodiments determine hardware and software configuration data of the remote computing device. The hardware and software configuration data comprises the resources allocated for the execution of the application and/or remote computing device load characteristics. The illustrative embodiments provide a local computing device in the server system in accordance with the determined hardware and software configuration data. For example, the local computing device has the same properties as the remote computing device e.g. clock cycle time, and may allocate the same resources to execute the application. The local computing device may also mimic the load of the remote computing device. The local computing device is provided such that the network time delay between the server and the local computing device is smaller than a predetermined maximum allowed network time delay. For example, the maximum allowed network time delay may be derived from the execution time error. It may be equal three times the execution time error.

The illustrative embodiments execute the application on the local computing device for determining the execution time of the application. The execution time is the amount of time required to execute the application to perform its function. The illustrative embodiments send an echo request packet to the remote computing device. The echo request packet may be a message sent to determine how long the traffic takes for a roundtrip. This echo request may not require execution time in the remote computing device. The illustrative embodiments determines a current network time delay from the elapsed time between sending and receiving a response to the echo request packet from the remote computing device. The illustrative embodiments calculate the timeout value from the current network time delay and the execution time. The illustrative embodiments repeats the sending, determining, and calculating steps during execution of the application by the remote computing device for repeatedly updating the timeout value using the calculated timeout value.

These features may be advantageous as they may dynamically update the timeout value taking into account the computer system operational conditions. This is in contrast to conventional methods, where in case of a network's congestion, the execution of the application may be interrupted due to timeout expiration since the timeout is not tailored for the current network conditions. This may be of particular relevance in an environment of multiple remote computing devices connected via network and being steered by a server.

Another advantage may be that these features may provide an accurate timeout value which may take into account real online operational conditions of the computer system. The operational conditions may for example comprise the number of concurrent applications being executed by the remote computing device.

According to one embodiment, the local computing device is provided by creating a virtual machine by the server using the hardware and software configuration data. This may be advantageous, as it may provide a simple method for providing twin machines of the remote computing device using virtual resources.

According to one embodiment, the local computing device is part of a set of local computing devices, wherein the providing comprises: providing a data structure having one or more entries, each entry representing a local computing device of the set of local computing devices, each entry comprising a local computing device identifier and hardware and software configuration data of the local computing device, reading the data structure, selecting a local computing device identifier of the local computing device associated with the hardware and software configuration; selecting the local computing device represented by the local computing device identifier. This may be advantageous as it may provide an accurate execution time estimation method using a physical machine that mimics the remote computing device.

According to one embodiment, the selecting the local computing device further comprises: allocating resources to the application in accordance with the hardware and software configuration data. This may provide the same allocated resources to the application in the remote computing device.

According to one embodiment, the calculating comprises using the sum of the current network time delay and the execution time. For example, the timeout value may be equal to the sum. This may be advantageous, as it may reliably provide the required time to run and to obtain the application results. This may prevent interruption of the application while excluding unnecessary resource usage that would otherwise be required in case of a longer time period.

According to one embodiment, the calculated timeout value is equal to a selected amount determined from the sum. For example, the timeout value may be equal to 1.2× sum. Adding 20% of the sum may take into account any time calculation error of the execution time and/or the current network time delay.

According to one embodiment, the updating comprises updating the timeout value in response to a determination that the sum of the current network time delay and the execution time is smaller than a predetermined maximum timeout value.

This may be advantageous, as it may avoid updating the timeout value when the result of calculation is unreasonable. For example, the threshold value may be set to a maximum time value that an application in extreme load conditions may require to be executed.

According to one embodiment, the updating comprises: determining that the calculated timeout value dissatisfies a predetermined criterion; prompting the current network delay time and the execution time to an administrator of the computer system to enter update data; receiving the update data via an interface from the administrator; updating the timeout value using the update data.

The predetermined criterion comprises for example that the calculated timeout value is a positive value. This may be advantageous, in case the system cannot update the timeout value because of error values such as a negative time value, a zero, an infinity value, and/or a not-a-number (NaN). Inputs from the administrator may help to decide on how to proceed in this case.

According to one embodiment, the method further comprises the steps of: suspending the execution of the application in the remote computing device; prompting state data of the remote computing device to a user of the application; receiving response data from the user; updating the timeout value based on the received response data; and resuming the execution of the application.

The state data may comprise, for example, a log file having the output results of the application before the suspension starts. The state data may also comprise the execution time and the network delay time of the application. The received data may be indicative of a command for updating or not updating the timeout value. This may be advantageous, as it may allow the user to decide on updating or not updating the timeout value based on physical content of the outputs. For example, in case the outputs of the application do not reflect the user's expectations he or she may decide to not update the timeout value as he or she may need to rerun the application with a different configuration to meet the expectations.

According to one embodiment, the method further comprises updating the timeout value using the timeout value and a suspension time value. The suspension time value is the amount of time elapsed between the prompting and the reception of the response data. For example, the suspension time value may be subtracted from the calculated timeout value provided that the timeout value after subtraction is not smaller than the sum of the execution time and the network time delay. This may be advantageous as it may take into account the suspension time during which the resources although not used are still allocated to the application. This may provide an equitable resource allocation for different users or applications in the sense that the total time allocated to each user to run his or her application is the same, independent of the suspension time used by the user. For example, in a system that uses this advantageous embodiment, the timeout value may be set to a lower value than for a system which does not profit from this advantageous option.

According to one embodiment, the sending is performed by pinging an IP address associated with the remote computing device.

According to one embodiment, the step a) further comprises: determining a set of hardware and software configuration data of the remote computing device associated with respective operational conditions of the remote computing device; for each hardware and software configuration data of the set of hardware and configuration data: providing a local computing device in the server system in accordance with the given hardware and software configuration data; executing the application on the local computing device for determining the execution time of the application; thereby providing a set of execution time values.

The operational condition comprises: number of concurrent different and/or same applications being executed by the remote computing device.

This may be advantageous as it may provide an execution time value which may take into account the changing load of the remote computing device.

According to one embodiment, the calculating is performed using the execution time being selected from the set of execution time values based on the determined hardware and software configuration data.

In another aspect, the invention relates to a computer-readable medium, comprising computer-readable program code embodied therewith which, when executed by a processor, cause the processor to execute a method according to anyone of the previous embodiments.

In another aspect, the invention relates to a computer server for use in a computer system for updating a timeout value of an application, wherein the computer server is part of a server system, wherein the computer server and a remote computing device of the computer system are separate from each other and connected with each other via a network, wherein the computer system is adapted to execute the application on the remote computing device, the computer server being adapted for:
  a. determining hardware and software configuration data of the remote computing device;
  b. providing a local computing device in the server system in accordance with the determined hardware and software configuration data;
  c. executing the application on the local computing device for determining the execution time of the application;
  d. sending an echo request packet to the remote computing device;
  e. determining a current network time delay from the elapsed time between sending and receiving a response to the echo request packet from the remote computing device;
  f. calculating the timeout value from the current network time delay and the execution time;
  g. repeating steps d)-f) during execution of the application by the remote computing device for repeatedly updating the timeout value using the calculated timeout value.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

The invention claimed is:

1. A computer implemented method for updating a timeout value of an application in a computer system, the method comprising:
   determining hardware and software configuration data of a remote computing device, wherein the remote computing device is a device separate from a local computing device and a server system in which the local computing device resides;
   providing the local computing device in the server system in accordance with the determined hardware and software configuration data of the remote computing device;
   executing the application on the local computing device for determining an execution time of the application;
   sending an echo request packet to the remote computing device;
   determining a current network time delay from an elapsed time between sending the echo request packet and receiving a response to the echo request packet from the remote computing device;
   calculating the timeout value from the current network time delay and the execution time associated with executing the application on the local computing device, the timeout value comprising a time to send a request to the remote computing device to execute the application, the execution time associated with executing the application on the local computing device, and a time to receive a response from the remote computing device once the application has completed execution;
   executing the application on the remote computing device; and
   repeating the steps of sending, determining, and calculating during execution of the application by the remote computing device for repeatedly updating the timeout value using the calculated timeout value.

2. The method according to claim 1, wherein the local computing device is provided by creating a virtual machine by the server using the hardware and software configuration data.

3. The method according to claim 1, wherein the local computing device is part of a set of local computing devices, wherein the providing the local computing device in the server system in accordance with the determined hardware and software configuration data further comprises:
   providing a data structure having one or more entries, each entry representing a local computing device of the set of local computing devices, each entry comprising a local computing device identifier and hardware and software configuration data of the local computing device;
   reading the data structure;
   selecting a local computing device identifier of the local computing device associated with the hardware and software configuration; and
   selecting the local computing device represented by the local computing device identifier.

4. The method according to claim 1, wherein calculating the timeout value from the current network time delay and the execution time associated with executing the application on the local computing device comprises using the sum of the current network time delay and the execution time associated with executing the application on the local computing device.

5. The method according to claim 1, wherein updating the timeout value using the calculated timeout value further comprises:
   updating the timeout value in response to a determination that the sum of the current network time delay and the execution time associated with executing the application on the local computing device is smaller than a predetermined maximum timeout value.

6. The method according to claim 1, wherein updating the timeout value using the calculated timeout value further comprises:
   determining that the calculated timeout value dissatisfies a predetermined criterion;
   prompting the current network delay time and the execution time to an administrator of the computer system to enter update data;
   receiving the update data via an interface from the administrator; and
   updating the timeout value using the update data.

7. The method according to claim 1, further comprising:
   suspending the execution of the application in the remote computing device;
   prompting state data of the remote computing device to a user of the application;
   receiving response data from the user;
   updating the timeout value based on the received response data; and
   resuming the execution of the application.

8. The method according to claim 1, wherein sending the echo request packet to the remote computing device is performed by pinging an IP address associated with the remote computing device.

9. The method according to claim 1, wherein the determining the hardware and software configuration data of the remote computing device further comprises:
    determining a set of hardware and software configuration data of the remote computing device associated with respective operational conditions of the remote computing device;
    for each hardware and software configuration data of the set of hardware and configuration data, providing a local computing device in the server system in accordance with the given hardware and software configuration data; and
    executing the application on the local computing device for determining the execution time of the application, thereby providing a set of execution time values.

10. The method according to claim 9, wherein calculating the timeout value from the current network time delay and the execution time is performed using the execution time being selected from the set of execution time values based on the determined hardware and software configuration data.

11. A computer program product comprising a non-transitory computer readable storage medium having a computer readable program stored therein, wherein the computer readable program, when executed on a computing device, causes the computing device to:
    determine hardware and software configuration data of a remote computing device, wherein the remote computing device is a device separate from a local computing device and a server system in which the local computing device resides;
    provide the local computing device in the server system in accordance with the determined hardware and software configuration data of the remote computing device;
    execute an application on the local computing device for determining an execution time of the application;
    send an echo request packet to the remote computing device;
    determine a current network time delay from an elapsed time between sending the echo request packet and receiving a response to the echo request packet from the remote computing device;
    calculate a timeout value from the current network time delay and the execution time associated with executing the application on the local computing device, the timeout value comprising a time to send a request to the remote computing device to execute the application, the execution time associated with executing the application on the local computing device, and a time to receive a response from the remote computing device once the application has completed execution;
    executing the application on the remote computing device; and
    repeat the computer readable program to send, determine, and calculate during execution of the application by the remote computing device for repeatedly updating the timeout value using the calculated timeout value.

12. A computer server comprising:
    a processor; and
    a memory coupled to the processor, wherein the memory comprises instructions which, when executed by the processor, cause the processor to:
    determine hardware and software configuration data of a remote computing device, wherein the remote computing device is a device separate from a local computing device and a server system in which the local computing device resides;
    provide the local computing device in the server system in accordance with the determined hardware and software configuration data of the remote computing device;
    execute an application on the local computing device for determining an execution time of the application;
    send an echo request packet to the remote computing device;
    determine a current network time delay from an elapsed time between sending the echo request packet and receiving a response to the echo request packet from the remote computing device;
    calculate a timeout value from the current network time delay and the execution time associated with executing the application on the local computing device, the timeout value comprising a time to send a request to the remote computing device to execute the application, the execution time associated with executing the application on the local computing device, and a time to receive a response from the remote computing device once the application has completed execution;
    executing the application on the remote computing device; and
    repeat the computer program to send, determine, and calculate during execution of the application by the remote computing device for repeatedly updating the timeout value using the calculated timeout value.

13. The computer program product according to claim 11, wherein the local computing device is part of a set of local computing devices, wherein the computer readable program to provide the local computing device in the server system in accordance with the determined hardware and software configuration data further causes the computing device to:
    provide a data structure having one or more entries, each entry representing a local computing device of the set of local computing devices, each entry comprising a local computing device identifier and hardware and software configuration data of the local computing device;
    read the data structure;
    select a local computing device identifier of the local computing device associated with the hardware and software configuration; and
    select the local computing device represented by the local computing device identifier.

14. The computer program product according to claim 11, wherein the computer readable program to update the timeout value using the calculated timeout value further causes the computing device to:
    update the timeout value in response to a determination that the sum of the current network time delay and the execution time associated with executing the application on the local computing device is smaller than a predetermined maximum timeout value.

15. The computer program product according to claim 11, wherein the computer readable program to update the timeout value using the calculated timeout value further causes the computing device to:
    determine that the calculated timeout value dissatisfies a predetermined criterion;
    prompt the current network delay time and the execution time to an administrator of the computer system to enter update data;

receive the update data via an interface from the administrator; and update the timeout value using the update data.

16. The computer program product according to claim 11, wherein the computer readable program further causes the computing device to:

suspend the execution of the application in the remote computing device;

prompt state data of the remote computing device to a user of the application;

receive response data from the user;

update the timeout value based on the received response data; and resume the execution of the application.

17. The computer server according to claim 12, wherein the local computing device is part of a set of local computing devices, wherein the instructions to provide the local computing device in the server system in accordance with the determined hardware and software configuration data further cause the processor to:

provide a data structure having one or more entries, each entry representing a local computing device of the set of local computing devices, each entry comprising a local computing device identifier and hardware and software configuration data of the local computing device;

read the data structure;

select a local computing device identifier of the local computing device associated with the hardware and software configuration; and select the local computing device represented by the local computing device identifier.

18. The computer server according to claim 12, wherein the instructions to update the timeout value using the calculated timeout value further cause the processor to:

update the timeout value in response to a determination that the sum of the current network time delay and the execution time associated with executing the application on the local computing device is smaller than a predetermined maximum timeout value.

19. The computer server according to claim 12, wherein the instructions to update the timeout value using the calculated timeout value further cause the processor to:

determine that the calculated timeout value dissatisfies a predetermined criterion;

prompt the current network delay time and the execution time to an administrator of the computer system to enter update data;

receive the update data via an interface from the administrator; and update the timeout value using the update data.

20. The computer server according to claim 12, wherein the instructions further cause the processor to:

suspend the execution of the application in the remote computing device;

prompt state data of the remote computing device to a user of the application;

receive response data from the user;

update the timeout value based on the received response data; and resume the execution of the application.

* * * * *